(12) United States Patent
Miyuki

(10) Patent No.: US 7,577,610 B2
(45) Date of Patent: Aug. 18, 2009

(54) POS TERMINAL FOR EASY SPLIT-THE-BILL SETTLEMENT

(75) Inventor: Takuro Miyuki, Kawasaki (JP)

(73) Assignee: NEC Infrontia Corporation, Kanagawa (JP)

(*) Notice: Subject to any disclaimer, the term of this patent is extended or adjusted under 35 U.S.C. 154(b) by 280 days.

(21) Appl. No.: 11/396,577

(22) Filed: Apr. 4, 2006

(65) Prior Publication Data
US 2006/0229984 A1 Oct. 12, 2006

(30) Foreign Application Priority Data
Apr. 8, 2005 (JP) .............................. 2005-111752

(51) Int. Cl.
G06Q 30/00 (2006.01)
(52) U.S. Cl. ......................................... 705/40; 705/15
(58) Field of Classification Search ............. 705/15–17, 705/39–43, 76–77; 235/7 R; 725/1, 5–7; 340/286.09
See application file for complete search history.

(56) References Cited

U.S. PATENT DOCUMENTS

| | | | | |
|---|---|---|---|---|
| 2003/0078793 A1* | 4/2003 | Toth | | 705/1 |
| 2005/0043996 A1* | 2/2005 | Silver | | 705/15 |
| 2005/0071232 A1* | 3/2005 | Frater | | 705/16 |
| 2005/0108116 A1* | 5/2005 | Dobson et al. | | 705/30 |
| 2006/0143087 A1* | 6/2006 | Tripp et al. | | 705/15 |

FOREIGN PATENT DOCUMENTS

| | | |
|---|---|---|
| JP | 57-202157 U | 12/1982 |
| JP | 63-234353 A | 9/1988 |
| JP | 7-320160 A | 12/1995 |

OTHER PUBLICATIONS

Cummings, "The Safeway Culture—Quality Management in Retailing", Managing Service Quality v4n3, pp. 14-18.*

* cited by examiner

*Primary Examiner*—Mary Cheung
(74) *Attorney, Agent, or Firm*—Sughrue Mion, PLLC

(57) ABSTRACT

A POS terminal is capable of calculating and charging the shares of a plurality of customers easily and accurately on a split-the-bill settlement basis. A RAM stores information as to items ordered by the customers and amounts of money for the items. A display unit displays the items and the amounts of money for the items. An input unit is used to process the items and the amounts of money for the items which are displayed on the display unit. A CPU controls the display unit to display a split-the-bill settlement image for allowing the customers to pay their shares on the split-the-bill settlement basis, based on data entered into the input unit and the information stored in the RAM.

12 Claims, 9 Drawing Sheets

POS TERMINAL FOR EASY SPLIT-THE-BILL SETTLEMENT

BACKGROUND OF THE INVENTION

1. Field of the Invention

The present invention relates to a POS (Point Of Sale) terminal for allowing a plurality of customers to pay a bill easily on a split-the-bill settlement basis.

2. Description of the Related Art

When a plurality of persons dine at a restaurant, for example, and split the total bill, it has been the general practice for them to declare their meals for payment and then for the server to calculate and charge their shares for the respective menu items.

POS terminals that have been used in restaurants in recent years are capable of displaying all menu items ordered by a plurality of customers and respective prices for the ordered items. According to such a POS terminal, when the server selects one at a time of the displayed menu items, the selected menu item and its price are displayed for the corresponding customer to pay. When the payment is made, the settled menu item is deleted from the displayed menu items, and the other menu items and their prices to be settled are displayed for the remaining customers to pay. In this manner, the customers pay their shares on a split-the-bill settlement basis. Such conventional split-the-bill settlement processes are disclosed in JP-1982-202157U, JP-1988-234353A, and JP-1995-320160A.

However, when the server is to calculate and charge the shares of the customers for their respective menu items based on the declared meals, the server needs to enter the amount of money corresponding to each of the menu items into the POS terminal for processing each of the customers. According to the processes disclosed in the above patent documents, since the server has to calculate the shares of the customers successively, if one of the customers has made a mistake in selecting a menu item, then the server cannot recognize the mistake until the server calculates the share of the last customer in the series of calculations.

SUMMARY OF THE INVENTION

It is an object of the present invention to provide a POS terminal which is capable of calculating and charging the shares of a plurality of customers easily and accurately on a split-the-bill settlement basis.

According to the present invention, a storage unit stores information as to items ordered by a plurality of customers and amounts of money for the items, and a controller generates split-the-bill information representing the items ordered by the customers and the amounts of money for the items, in association with the respective customers, based on data entered into an input unit and the information stored by the storage unit. The controller controls a display unit to display a split-the-bill settlement image representing the items ordered by the customers and the amounts of money for the items, based on the split-the-bill information.

The split-the-bill settlement image is displayed by the display unit based on the split-the-bill information that is generated based on the items and the amount of money therefore which are stored by the storage unit, each time one of the customers is processed. Therefore, each customer can confirm prior to payment whether the item or items ordered by the customer and the amount of money therefore are correct or not.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
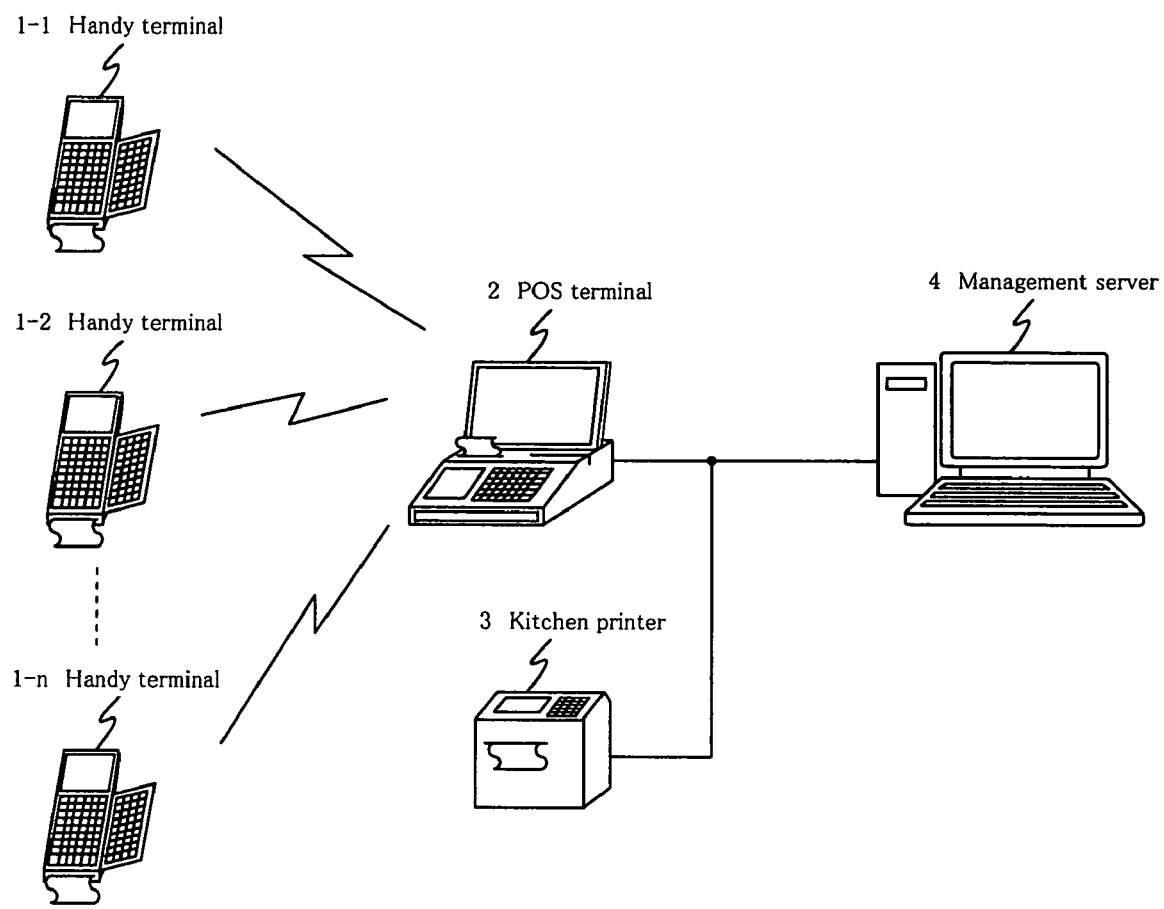
FIG. 1 is a schematic view of a POS system incorporating a POS terminal according to the present invention.

As shown in FIG. 1, a POS (Point Of Sale) system comprises a plurality of handy terminals 1-1 through 1-n, POS terminal 2, kitchen printer 3, and management server 4, and is typically installed in a restaurant or the like. Handy terminals 1-1 through 1-n are carried by servers in the restaurant for entering items ordered by customers and table numbers for the customers. POS terminal 2 is connected to handy terminals 1-1 through 1-n in a wireless fashion, and calculates and charges amounts of money for the ordered items. Kitchen printer 3 is placed in the kitchen of the restaurant, and prints details of items ordered by customers that have been entered by handy terminals 1-1 through 1-n. Management server 4 is connected to POS terminal 2, and manages the sales of the restaurant. Order information entered by handy terminals 1-1 through 1-n is sent as transmission data to POS terminal 2 and kitchen printer 3.

Figure 2:
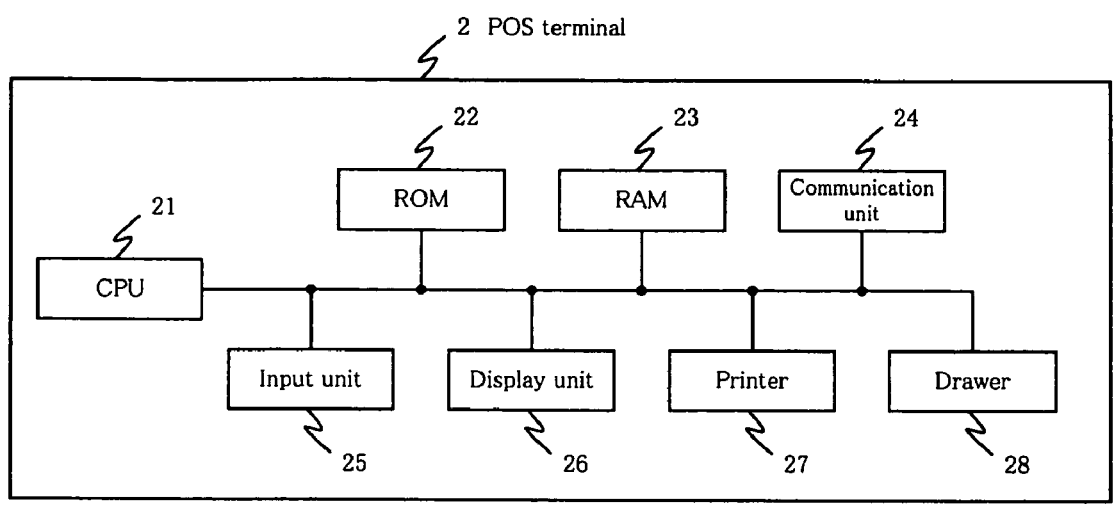
FIG. 2 is a block diagram of the POS terminal shown in FIG. 1.

As shown in FIG. 2, POS terminal 2 comprises ROM 22, RAM 23, input unit 25, printer 27, drawer 28, communication unit 24, display unit 26, and CPU 21 serving as a controller for controlling the above components of POS terminal 2. ROM 22 stores a program for controlling POS terminal 2. RAM 23 is a storage unit for storing the program that is transferred from ROM 22 when POS terminal 2 is activated. Input unit 25 is used by servers or customers to enter information from outside of POS terminal 2. Printer 27 serves to print calculated data. Drawer 28 holds cash, etc. therein. Communication unit 24 receives order information sent from handy terminals 1-1 through 1-n and sends calculated data to a server or the like which manages the sales. Display unit 26 displays information entered through input unit 25 and order information, etc. received by communication unit 24. Order information sent from handy terminals 1-1 through 1-n and received by communication unit 24, and amounts of money for ordered items are stored in RAM 23.

A processing sequence of POS terminal 2 will be described below with reference to FIG. 3.

When POS terminal 2 is activated, the program stored in ROM 22 is transferred to RAM 23 by CPU 21. The transferred program is stored in ROM 23. CPU 21 controls POS terminal 2 based on the program stored in ROM 23. POS terminal 2 is now capable of performing a settlement process.

Figure 3:
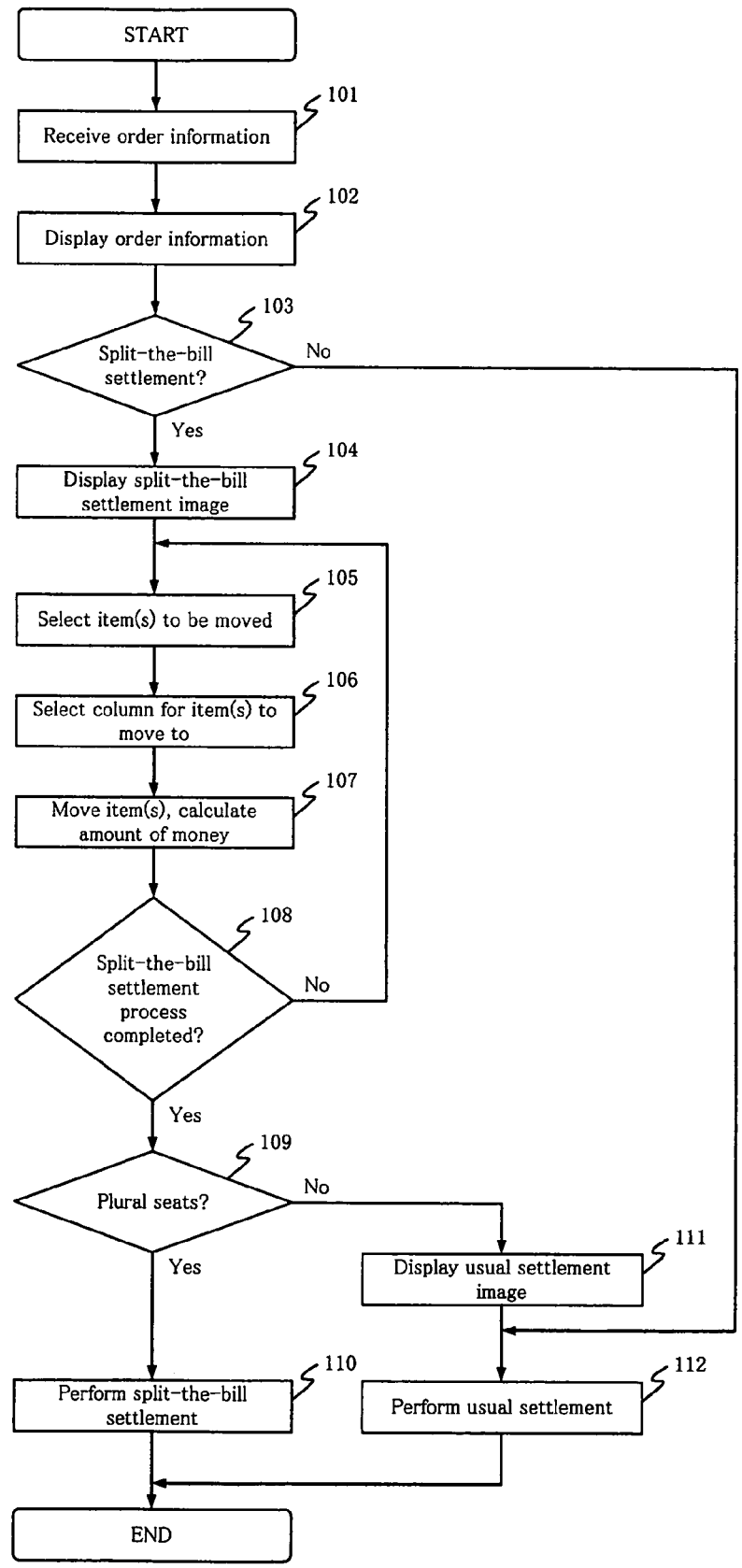
FIG. 3 is a flowchart of a processing sequence of the POS terminal shown in FIG. 2.

After POS terminal 2 is activated, when a server takes orders from customers and enters details of ordered items and a table number for the customers as order information into handy terminal 1-1, the entered order information is sent from handy terminal 1-1 and received by communication unit 24 of POS terminal 2 in step 101 shown in FIG. 3.

Figure 4:
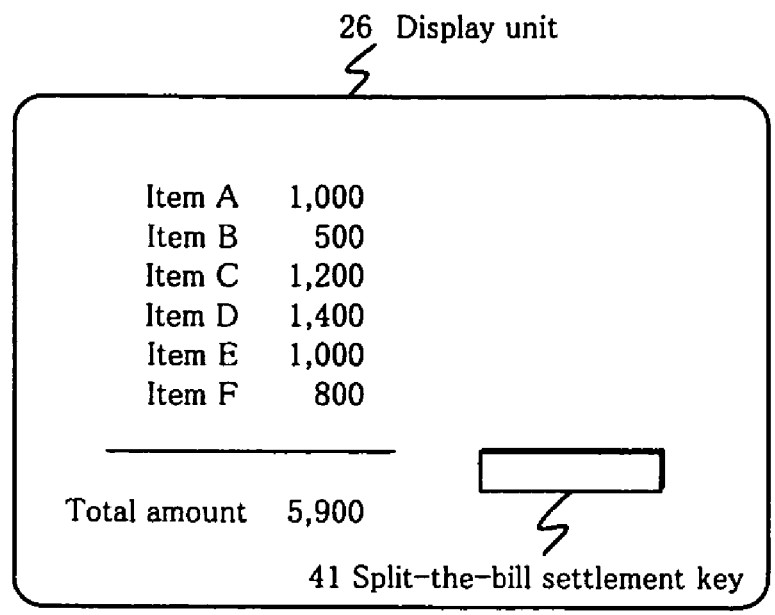
FIG. 4 is a view showing, by way of example, an image displayed by a display unit for performing a split-the-bill settlement process for calculating the shares of customers to pay.

Thereafter, the customers finish the meals, and operate input unit 25 for payment to enter the table number into POS terminal 2. In step 102, a list of the ordered items corresponding to the entered table number and amounts of money charged for the ordered items are displayed on display unit 26 as shown in FIG. 4. It is assumed that the customers are four colleagues having meals together.

Figure 5:
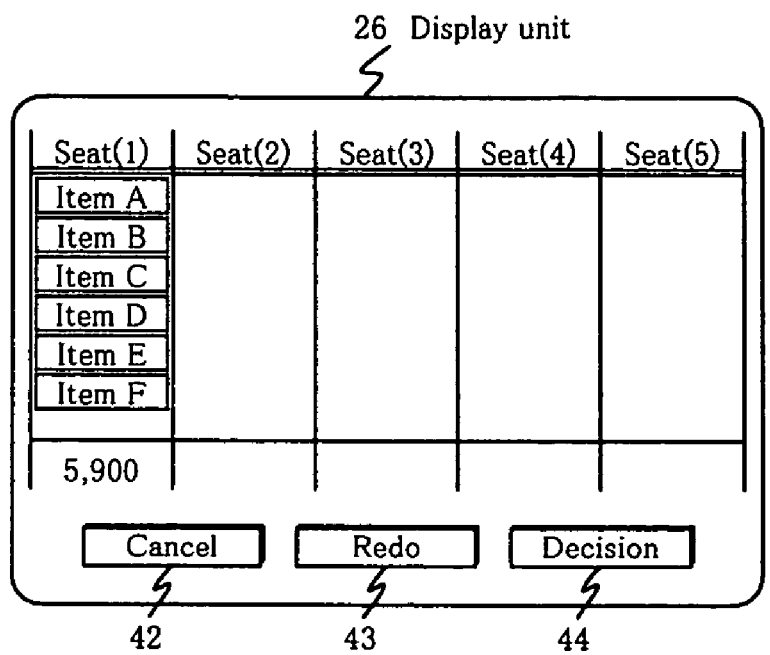
FIG. 5 is a view showing, by way of example, another image displayed by the display unit for performing the split-the-bill settlement process for calculating the shares of customers to pay.

If the customers are to pay for the meals on a split-the-bill settlement basis, and the server or one of the customers selects split-the-bill settlement key 41 displayed on display unit 26 in step 103, then an image shown in FIG. 5 is displayed on display unit 26 in step 104. The server or the customer may select split-the-bill settlement key 41 by operating a mouse connected to POS terminal 2 to move a pointer displayed on display unit 26 to split-the-bill settlement key 41 and then clicking on the mouse, or alternatively by touching split-the-bill settlement key 41 displayed on display unit 26 which comprises a touch panel.

As shown in FIG. 5, display unit 26 displays the columns of seats (1) through (5) for displaying items A through F and a total amount of money.

In an initial image displayed on display unit 26, all items A through F are displayed in the column of seat (1). Display unit 26 also displays cancel key 42, redo key 43, and decision key 44. Cancel key 42 is a key which, when selected, cancels all actions made in a process shown in FIGS. 5 through 8 and causes display unit 26 to display the image shown in FIG. 4. Redo key 43 is a key which, when selected, causes display unit 26 to display a preceding image.

Decision key 44 is a key which, when selected, decides on settled amounts of money.

Figure 6:
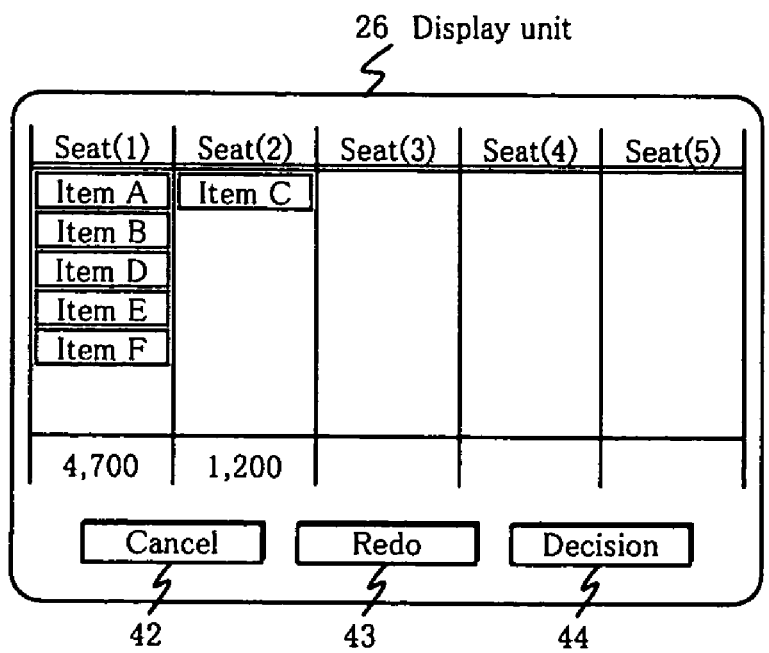
FIG. 6 is a view showing, by way of example, still another image displayed by the display unit for performing the split-the-bill settlement process for calculating the shares of customers to pay.

The customer seated on seat (2) selects item C ordered by the same customer in step 105, and, thereafter, selects the column of seat (2) in step 106. In step 107, as shown in FIG. 6, display unit 26 displays an image in which item C has moved from the column of seat (1) to the column of seat (2) and total amounts of money have been calculated for the columns of seats (1), (2). As a result, split-the-bill information for the customer seated on seat (2) has now been generated. The customer seated on seat (2) may select item (C) and the column of seat (2) by operating a mouse connected to POS terminal 2 to drag item C and drop item C on the column of seat (2), or alternatively by touching item C displayed in the column of seat (1) and then touching the column of seat (2) on display unit 26 which comprises a touch panel. Specifically, the mouse connected to POS terminal 2 or the touch panel as display unit 26 applies a signal to CPU 21, which controls display unit 26 depending on the applied signal. The color of displayed item C may be changed for better visual 25 recognition after item C displayed in the column of seat (1) is selected until item C is moved to the column of seat (2).

Figure 7:
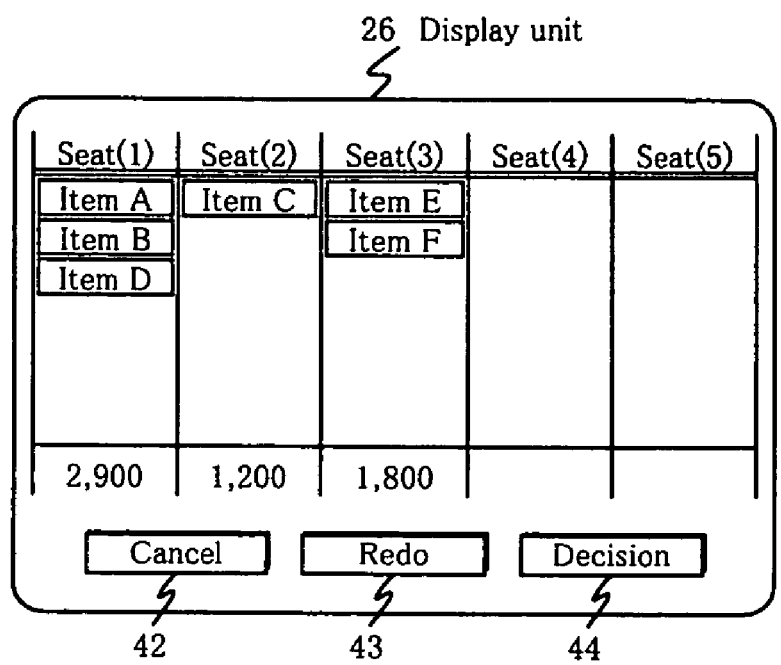
FIG. 7 is a view showing, by way of example, yet another image displayed by the display unit for performing the split-the-bill settlement process for calculating the shares of customers to pay.

Thereafter, if a split-the-bill settlement process still needs to be performed in step 108, then the processing sequence described above is repeated for other customers. For example, the customer seated on seat (3) selects items E, F ordered by the same customer, and, thereafter, selects the column of seat (3). As shown in FIG. 7, display unit 26 displays an image in which items E, F have moved from the column of seat (1) to the column of seat (3) and total amounts of money have been calculated for the columns of seats (1) through (3). As a result, split-the-bill information for the customer seated on seat (3) has now been generated. Though the customer seated on seat (3) have had a plurality of items unlike the customer seated on seat (2), the customer has carried out the same selection process as the customer seated on seat (2).

Figure 8:
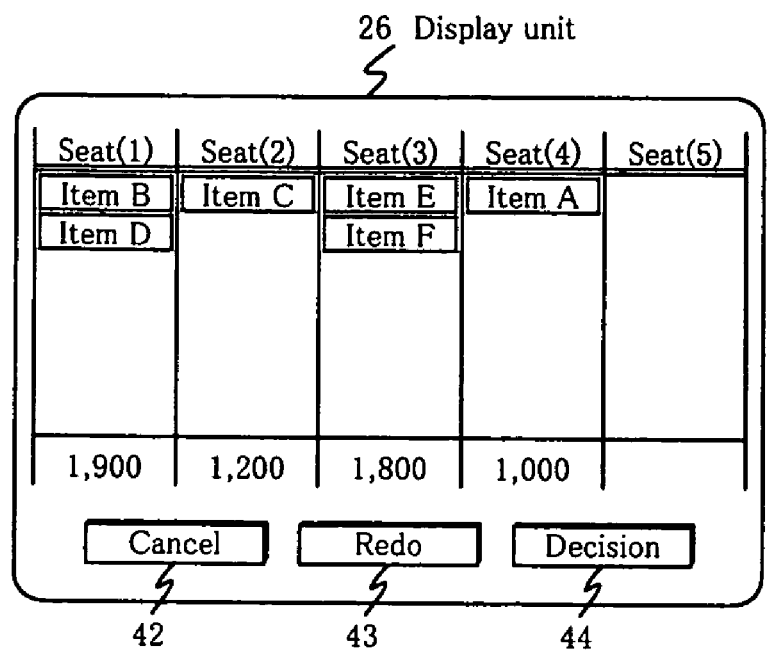
FIG. 8 is a view showing, by way of example, still yet another image displayed by the display unit for performing the split-the-bill settlement process for calculating the shares of customers to pay.

Then, the customer seated on seat (4) selects item A ordered by the same customer, and, thereafter, selects the column of seat (4). As shown in FIG. 8, display unit 26 displays an image in which item A has moved from the column of seat (1) to the column of seat (4) and total amounts of money have been calculated for the columns of seats (1) through (4). As a result, split-the-bill information for the customer seated on seat (4) has now been generated.

By thus operating on an image displayed on display unit 26, an item or items ordered by each customer and an amount of money therefore are displayed as a split-the-bill settlement image on display unit 26. Therefore, each customer can confirm prior to payment whether it is charged with a correct share for the meal or not.

When the server or one of the customers selects decision key 44 upon completion of the split-the-bill settlement processes for the respective four customers, it is determined in step 109 whether the number of customers is plural or not. Since the number of customers is plural in this example, the split-the-bill information is decided on in step 110, and slips for the respective customers are printed for payment by printer 27 based on the split-the-bill information. Slip numbers, items, and charged amounts of money printed on the respective slips are sent through communication unit 24 to management server 4, which registers the received data as management data.

If the number of customers is singular, then since no split-the-bill settlement process needs to be performed, a usual settlement image (the image shown in FIG. 4) is displayed on display unit 26 in step 111. Then, a usual single payment process is performed in step 112.

The number of columns under seats displayed on display unit 26 may be made changeable depending on the resolution and size of display unit 26.

The number of customers to be processed may not be specified at the time of entering order information, but may be decided on by selecting decision key 44 when a split-the-bill settlement process is performed. Alternately, before a split-the-bill settlement process is performed, as many columns under seats as the entered number of customers may be displayed on display unit 26.

Figure 9:
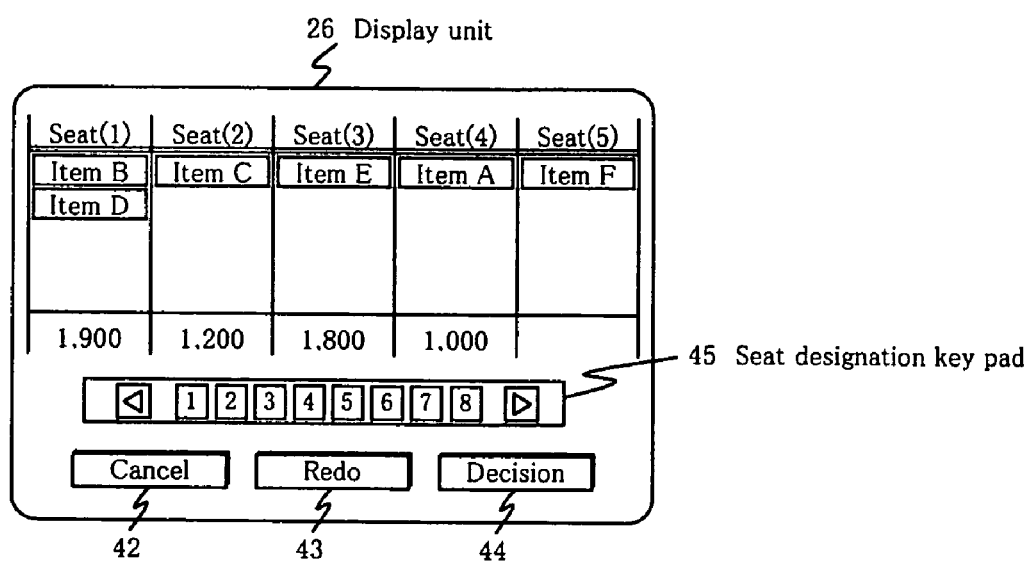
FIG. 9 is a view of the display unit with a seat designation key pad for displaying seats that are not presently displayed by the display unit.

As shown in FIG. 9, display unit 26 has seat designation key pad 45 in addition to the details of display unit 26 shown in FIGS. 5 through 8. It is assumed that as shown in FIG. 9, display unit 26 presently displays seats (1) through (5) and the number of customers to be processed simultaneously is six. When seat (4), for example, is selected, and a selection key "6" of seat designation key pad 45 is selected, the column of seat (6) is displayed in place of the column of seat (4).

If the number of customers to be processed simultaneously is eight, then a key at the right end of seat designation key pad 45, i.e., a triangular key pointed to the right, is selected. Then, selection keys "1" through "8" of seat designation key pad 45 change to selection keys "9" through "16", allowing seats for eight or more customers to be designated. These keys of seat designation key pad 45 may be selected using a mouse or a touch panel as described above.

Order information entered into handy terminals 1-2 through 1-n may be processed in the same manner as order information entered into handy terminal 1-1. Specifically, when a server takes orders from customers and enters details of ordered items and a table number for the customers as order information into each of handy terminals 1-2 through 1-n, the entered order information is sent from each of handy terminals 1-2 through 1-n to POS terminal 2.

Order information may be received by POS terminal 2 in step 101 without using handy terminals 1-1 through 1-n. For example, based on a hand-written order sheet, the server 25 may operate input unit 25 to enter orders into POS terminal 2, so that a list of the orders and amounts of money therefore may be displayed on display unit 26. Alternatively, a bar-code reader may be connected to POS terminal 2, and bar codes provided on an order sheet as indicating orders may be read by the bar-code reader, so that a list of the orders and amounts of money therefore may be displayed on display unit 26.

Seats at tables are displayed as seats (1) through (5), for example, on display unit 26. However, seats themselves do not need to be numbered, and any numbers may be used as inherent numbers which are capable of uniquely identifying respective customers.

In the illustrated embodiment, the program written in ROM 22 is transferred to RAM 23 when CPU 21 is activated. However, the program may be written in a recording medium other than ROM 22. For example, the program may be written in a removable recording medium such as a floppy disk, a magneto-optical disk, a DVD, a CD, or the like, or an HDD or the like incorporated in POS terminal 2.

While preferred embodiments of the present invention have been described using specific terms, such description is for illustrative purposes only, and it is to be understood that changes and variations may be made without departing from the spirit or scope of the following claims.

What is claimed is:

1. A POS terminal for allowing a plurality of customers to pay a bill easily on a split-the-bill settlement basis, comprising:
    a display unit;
    a storage unit for storing information as to items ordered by the customers and amounts of money for the items;
    an input unit; and
    a controller for generating split-the-bill information representing the items ordered by the customers and the amounts of money for the items, in association with the respective customers, based on data entered into said in-put unit and the information stored by said storage unit, and controlling said display unit to display a split-the-bill settlement image representing each respective customer simultaneously, along with the association between the items ordered and each respective customer, and the amounts of money owed by each respective customer for the items, based on said split-the-bill information.

2. The POS terminal according to claim 1, further comprising:
    a printer for printing payment slips for the respective customers based on said split-the-bill information.

3. The POS terminal according to claim 1, wherein said input unit comprises:
    a communication unit for receiving data transmitted from a handy terminal through which the items ordered by the customers are entered.

4. The POS terminal according to claim 1, wherein said input unit comprises:
    a mouse for outputting a signal; and
    said controller generates said split-the-bill information based on the signal output from said mouse.

5. The POS terminal according to claim 1, wherein said display unit comprises:
    a touch panel for outputting a signal; and
    said controller generates said split-the-bill information based on the signal output from said touch panel.

6. The POS terminal according to claim 1, wherein payment of the amounts of money owed by each respective customer is not permitted until the split-the-bill information displayed on said split-the-bill settlement image is accepted.

7. A method to be carried by a POS terminal for allowing a plurality of customers to pay a bill easily on a split-the-bill settlement basis, comprising the steps of:
    storing information as to items ordered by the customers and amounts of money for the items;
    generating split-the-bill information representing the items ordered by the customers and the amounts of money for the items, in association with the respective customers, based on data entered into said POS terminal and the stored information; and
    displaying a split-the-bill settlement image representing each respective customer simultaneously, along with the association between the items ordered and each respective customer, and the amounts of money owed by each respective customer for the items, based on said split-the-bill information.

8. The method according to claim 7, further comprising the step of:
    printing payment slips for the respective customers based on said split-the-bill information.

9. The method according to claim 7, wherein payment of the amounts of money owed by each respective customer is not permitted until the split-the-bill information displayed on said split-the-bill settlement image is accepted.

10. A computer-readable medium storing a control program for enabling a computer to perform a process comprising:
    storing information as to items ordered by respective customers and entered into the computer and amounts of money for the items;
    generating split-the-bill information representing the items ordered by the customers and the amounts of money for the items, in association with the respective customers, based on data entered into a POS terminal and the stored information; and
    displaying a split-the-bill settlement image representing each respective customer simultaneously, along with the association between the items ordered and each respective customer, and the amounts of money owed by each respective customer for the items, based on said split-the-bill information.

11. The computer readable medium according to claim 10, wherein said process further comprises:

printing payment slips for the respective customers based on said split-the-bill information.

12. The computer-readable medium according to claim 10, wherein payment of the amounts of money owed by each respective customer is not permitted until the split-the-bill information displayed on said split-the-bill settlement image is accepted.

* * * * *